United States Patent [19]
Carrier

[11] Patent Number: 6,038,770
[45] Date of Patent: Mar. 21, 2000

[54] PROCESS FOR THE PRODUCTION OF WOOD-VENEER STEERING WHEEL

[75] Inventor: Rainer Carrier, Rancate, Germany

[73] Assignee: Rainer Carrier, Rancate/Ti, Switzerland

[21] Appl. No.: 09/192,259

[22] Filed: Nov. 13, 1998

Related U.S. Application Data

[63] Continuation-in-part of application No. PCT/CH97/00071, Feb. 25, 1997.

[51] Int. Cl.$^7$ .................................................. B29C 44/06
[52] U.S. Cl. .......................................................... 29/894.1
[58] Field of Search ............................ 29/894.1; 74/552; 156/221, 312, 313, 306.6, 306.9

[56] References Cited

U.S. PATENT DOCUMENTS

| | | | |
|---|---|---|---|
| 509,259 | 11/1893 | Stall | 74/552 |
| 1,088,999 | 3/1914 | Kormendy | 74/552 |
| 1,421,434 | 7/1922 | Erickson | 74/552 |
| 1,435,745 | 11/1922 | Schirmer | 74/552 |
| 2,261,264 | 11/1941 | Lüty | 156/312 |
| 5,792,302 | 8/1998 | Nakada et al. | 156/293 |

*Primary Examiner*—P. W. Echols
*Attorney, Agent, or Firm*—Graham & James LLP

[57] ABSTRACT

A method for producing wooden segments for steering wheels for motor vehicles. In the process a plurality of wood veneers are bonded to form segments in a heated steel mold having the predetermined radii of the steering wheel. The segments are then profiled and bonded onto the core profile of the steering wheel. Variations of process provide segments with root grain veneer and differently colored veneer layers.

2 Claims, 4 Drawing Sheets

PROCESS FOR THE PRODUCTION OF WOOD-VENEER STEERING WHEEL

This is a continuation in part of PCT/CH97/00071 filed Feb. 25, 1997 and having a U.S. designation.

FIELD OF THE INVENTION

This invention relates to wooden steering wheels and the process for preparing them and particularly wooden steering wheels with decorative veneers.

BACKGROUND OF THE INVENTION

Present processes for the production of wooden steering wheels produce steering wheels which, despite the extra cost, are often unsatisfactory in appearance and stability. In addition, current methods are technically and economically less suitable for the production of such steering wheels, with aesthetic looking veneer grains such as burl-veneer or multi color.

The common process used in producing wooden or wood based steering wheels for motor vehicles involves using wood-veneer with a thickness of about 1.5 mm, about 4000 mm in length (from a roll or sheet) and about 100–200 mm in width. The veneer cuttings are laminated into a circular shape by rolling them around a steel core after the application of cold, liquid urethane bonding material (glue). The rolls are then clamped together and placed into a curing oven for a period of about 10–15 hours.

After the curing step, the rolls are horizontally sliced into half segments arcs. A recess, corresponding in dimension to the steering wheel rim, is then routered onto the segments (generally with a numerically controlled router). A final length of the segment is then cut and assembled on a tubular steel core with the segment arcs being glued together over the tubular steel core. After a sufficient curing time, the segments are machined, in situ, into their final shape with a numerically controlled router and various cutting tools.

The present process entails many shortcomings among which are the application of liquid glue to the veneer, which uncontrollably affects the moisture content thereof and dimensional stability of the laminated parts. In addition, the rolling of the veneer around the forming core is effected without controlled pressure thereby resulting in the varying strength of the veneer with uneven deformation tendencies relative to the laminated part. Once the laminated rings are cut into segments, as described, there is also a natural tendency to return or "spring-back" to their original unstressed form, thereby tending to increase radius, often in an uncontrolled manner and to an uncontrolled extent. As a result, the position of the wood segment on the steering wheel can vary markedly and, when taken in conjunction with a pre-established program for machining, the final position of the wood-segments over a steering wheel is not predictable or controllable. In addition, since the outer form is machined after the assembly of the wood-segments thereon, it is technically (without any realistic economy) difficult to laminate burl-veneer over the segments.

SUMMARY OF THE INVENTION

It is therefore an object of the present invention to provide a process for the economical and aesthetic application of wood and wood-veneer to a steering wheel for a motor vehicle.

It is another object of the present invention to provide a technically feasible method for aesthetically applying a burl-veneer to a steering wheel.

It is a further object of the present invention to provide a wood-based steering wheel with structural stability and which can be produced on a continuous basis.

Generally the present invention comprises a method for the production of wood based steering wheels and particularly with the aesthetic and stable placement of veneers thereon. Since such steering wheels could not be similarly made with prior art methods, the present invention further includes the so constructed steering wheels as well. In accordance with the present invention the same wood veneer of similar dimensions is processed by the following steps:

a) the veneer is cut to a specific length as required for the peripheral length of the desired size wood segment;

b) the cut lengths of veneers are positioned in a steel stamping press of predetermined arc shape (matching the radius of the steering wheel) for pressure compression thereof and the veneer is heated such as by mounting in a heated press, by electric heating and the like;

c) lamination of the wood veneer is effected with a urethane type sheet glue (commercially available) cut into sheets of the same dimension as the wood veneer;

d) resultant laminated shells are dimensioned in length and width, as segments suitable for further machining such as with NC-routers;

e) a recess for the tubular steel core of the steering wheel is formed in the laminated segments, preferably on a spindle or router with appropriate specific cutter heads, in a continuous process;

f) the segments are pre-sanded, cut to a final length, and assembled with a steering wheel in suitable, specially made fixtures while utilizing appropriate bonding and pressure.

The above and other objects, features and advantages of the present invention will become more evident from the following discussion and drawings in which:

SHORT DESCRIPTION OF THE DRAWINGS

DETAILED DESCRIPTION OF THE INVENTION

The present invention is useful in manufacturing wood segments for steering wheels used in automobiles, boats and the like. With the prior art process, strips of wood-veneer having a thickness of about 1.5 mm are coated with liquid glue and wrapped around a steel drum having about the same diameter as the inner diameter of the steering wheel rim. As a result, neither the necessary pressure for lamination nor the moisture, resulting from use of the liquid glue is controllable and, when wooden rings produced by the prior art process are machined to size, uncontrolled deformation occurs.

With the above described process of the present invention such problems are avoided. Thus, the manufacturing process of the present invention utilizes a specific number of veneer and foil glue (not liquid) layers in a heated mold having the desired radius. It is therefore possible to closely control the parameters of wood moisture, pressure, temperature, laminating time and final thickness of the segment, wherein the thickness of the veneer is economically limited to 0.5 to 2.0 mm.

In accordance with the present invention the laminated pieces are cut into segments and machined to the actual desired form as half shell segments which are bonded over the steering wheel core in special fixtures, and then sanded and finish coated.

Contrary to the prior art process, it is possible to provide a burl veneer, wherein, after the outer profile is machined, the burl veneer is applied to the outer surface of the segment in a heated stamping tool and with the urethane type sheet glue. In this application, the machining of the core profile is effected after the burl veneer is applied.

In another embodiment of the present invention the segment itself is initially laminated from veneer layers of different colors.

In accordance with the present invention the moisture content of the laminated part is controlled by the initial moisture content of the veneer and the normal moisture lost in the process, with residual moisture remaining as evenly distributed in the laminated part. Control of the temperature of the steel stamping tool, as well as the applied pressure and the time of lamination together with the shape of the stamping tool provides for accurate monitoring of the laminating process.

Since the parts are processed and machined on a feeder equipment spindle, there is a constant flow of parts with marked reduction in production time.

DETAILED DESCRIPTION OF THE DRAWINGS AND THE PREFERRED EMBODIMENTS

Figure 1:
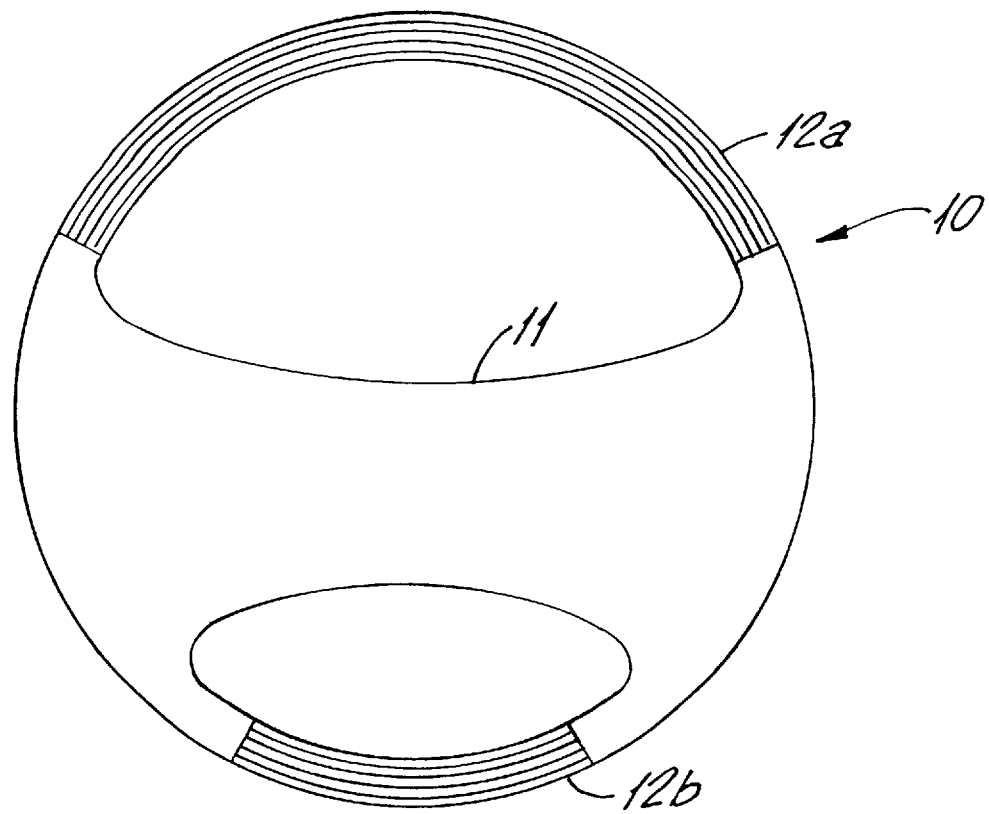
FIG. 1 is a typical steering wheel with air bag which has been provided with laminated wood segments.
Figure 2A:
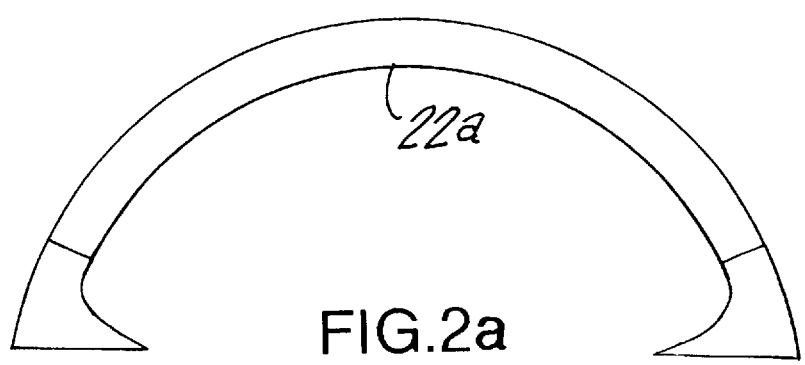
FIGS. 2a and 2b are variants of the steering wheel of FIG. 1 with burl-wood and multi color laminations respectively.
Figure 2B:
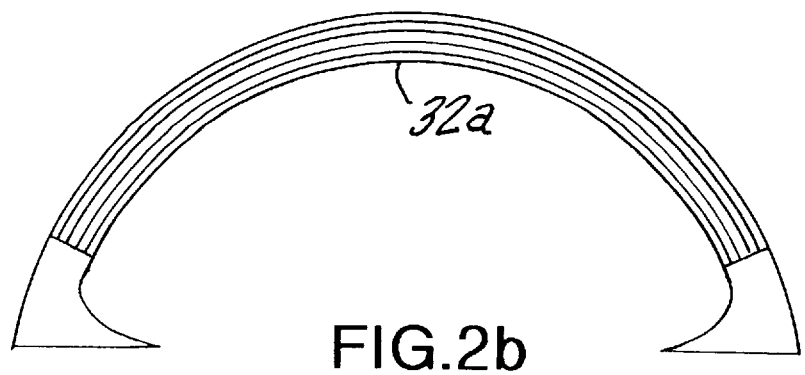

In FIG. 1, steering wheel 10 is shown with central air bag 11 and wood veneer segments 12a and 12b which provide a sporty aesthetically pleasing appearance. FIGS. 2a and 2b depict wood veneer segment 22a and 32a respectively of a burl-wood and multi color veneer appearance.

Figure 3A:
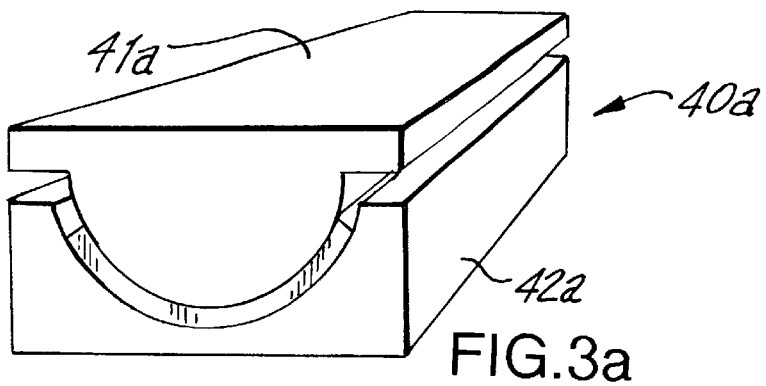
FIGS. 3a and 3b are single and double molds respectively as used in forming the laminated wood segments of the present invention.
Figure 3B:
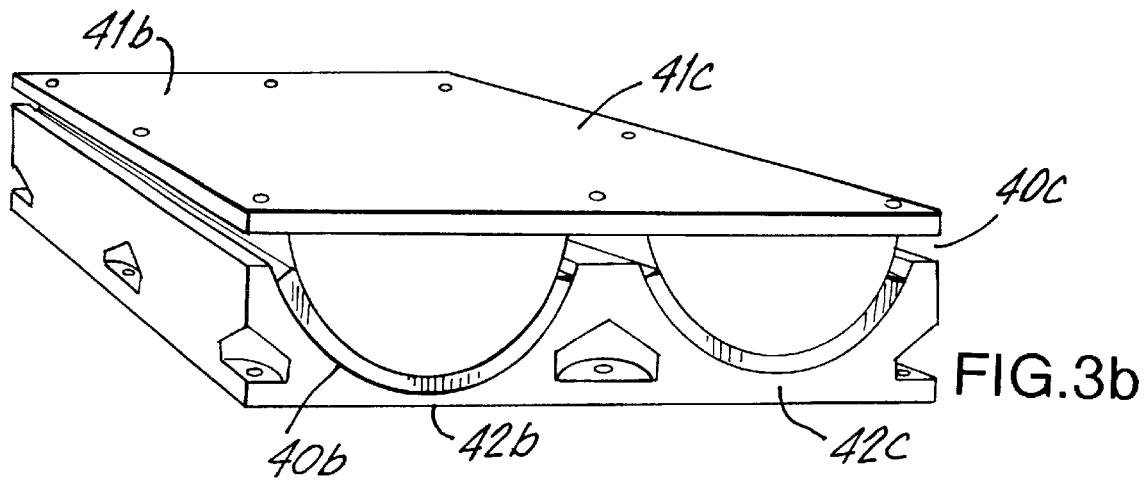
Figure 4A:
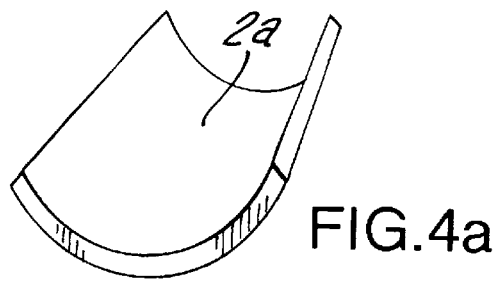
FIGS. 4a and 4b are single and double laminated segments respectively, as formed in the molds of FIGS. 3a and 3b respectively, of wood veneer as molded.
Figure 4B:
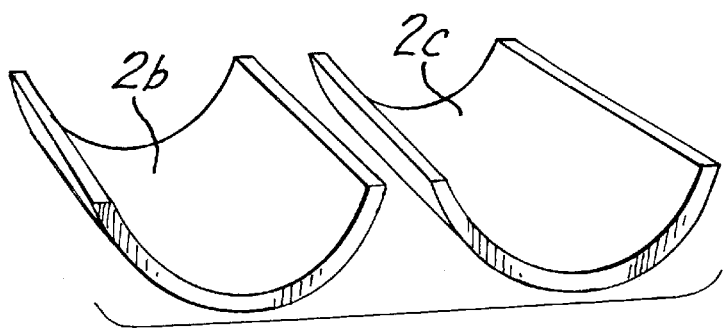

In processing the wood-veneers, they are cut to size and placed into the single steel press mold 40a or press mold pairs 40b and 40c as shown in FIGS. 3a and 3b, as units or in pairs. The molds all are comprised of curved interfitted upper segments 41a–c and lower bases 42a–c with a radius r corresponding to the radius of the steering wheel. The resultant wood-veneer segments 2a–c are depicted in FIGS. 4a and 4b with full stability.

Figure 5:
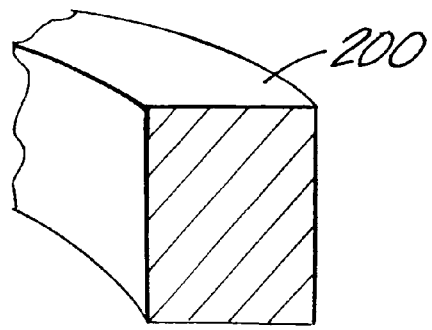
FIG. 5 is a typical pre-dimensioned profile of a segment of wood veneer laminate as obtained, as shown in FIGS. 4a and 4b.
Figure 6:
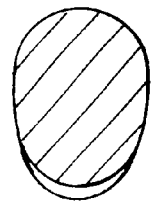
FIG. 6 is the segment of FIG. 5 with machined outer form.
Figure 7:
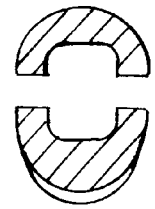
FIG. 7 is a view of the segmented and machined outer forms for assembly with a steering wheel.
Figure 8:
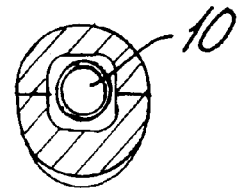
FIG. 8 is a sectioned view of the steering wheel with the outer veneer forms in place.
Figure 9A:
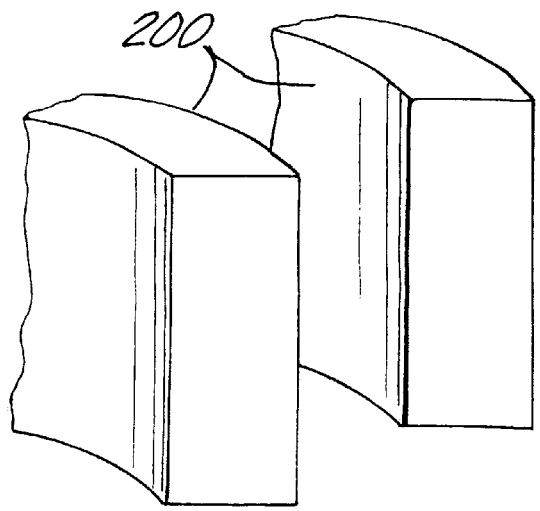
FIG. 9 is a production sequence showing laminated sheets being cored, machined and assembled on a steering wheel.
Figure 9B:
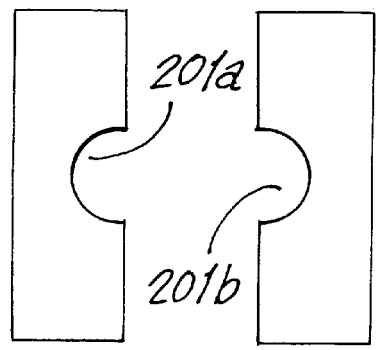
Figure 9C:
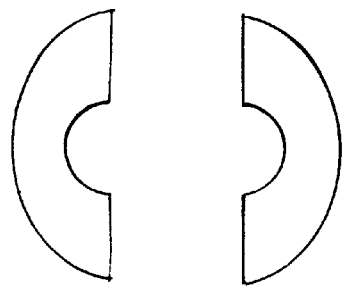
Figure 9D:
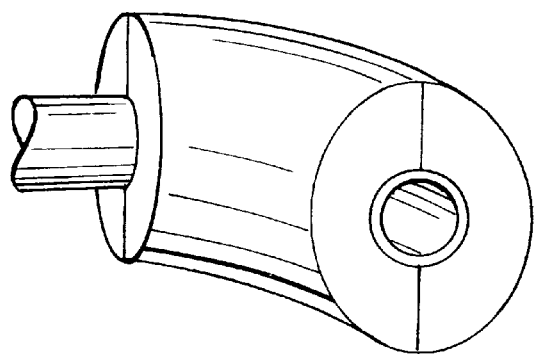

A segment of wood veneer 200 is shown in FIG. 5 as having multiple veneer layers and a square profile. The segment is machined (FIG. 6), and cut and cored (FIG. 7) and placed around a section of steering wheel 10 (FIG. 8).

As shown in greater production detail in FIG. 9, two segments 200 are internally shaped and cored with semi arcs 201a and 201b and thereafter circularly outer profiled. The cored and profiled segments are fitted around a tubular steel core of the steering wheel and bonded together.

It is understood that the above description of a preferred embodiment and the drawings are merely exemplary of the present invention and that changes in structure and process are possible without departing from the scope of the present invention as defined in the following claims.

What is claimed is:

1. A method for the production of wood based steering wheels comprising the steps of:
   a) preparing veneer segments of dimensions as required for the peripheral length of a desired size wood segment;
   b) placing the wood veneer segments into a mold of arc shape corresponding to an arc of a steering wheel onto which the veneer segment is to be placed, together with solid sheet glue between the veneer segments;
   c) compressing and heating the veneer segments in the mold to an extent sufficient to laminate the veneer segments together and to cause the veneer segments to assume the arc shape;
   d) profiling the outer surface of the segments to a final desired outer shape;
   e) cutting the profiled segments in half to provide two laminated segments and forming a recess in one surface of each of two laminated segments adapted for accommodation of a steering wheel therein; and
   f) bonding the laminated segments together around the steering wheel.

2. The method of claim 1, wherein a burl-veneer is bonded to the profiled segments prior to cutting them in half.

* * * * *